United States Patent
Yan et al.

(10) Patent No.: US 10,904,627 B2
(45) Date of Patent: Jan. 26, 2021

(54) METHOD FOR ADJUSTING MULTIMEDIA PLAYING PROGRESS

(71) Applicant: HUAWEI TECHNOLOGIES CO., LTD., Guangdong (CN)

(72) Inventors: Bing Yan, Shenzhen (CN); Mingliang Du, Shanghai (CN); Maochang Dang, Shanghai (CN); Yuxiang Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 16/063,934

(22) PCT Filed: Dec. 31, 2015

(86) PCT No.: PCT/CN2015/100276
§ 371 (c)(1),
(2) Date: Jun. 19, 2018

(87) PCT Pub. No.: WO2017/113363
PCT Pub. Date: Jul. 6, 2017

(65) Prior Publication Data
US 2020/0275161 A1    Aug. 27, 2020

(51) Int. Cl.
*H04N 21/431* (2011.01)
*H04N 21/472* (2011.01)
*H04N 21/845* (2011.01)

(52) U.S. Cl.
CPC ... *H04N 21/47217* (2013.01); *H04N 21/4312* (2013.01); *H04N 21/47202* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2009/0055884 A1 | 2/2009 | Park et al. | |
| 2009/0199117 A1* | 8/2009 | Yamamoto | H04N 5/44543 715/764 |

(Continued)

FOREIGN PATENT DOCUMENTS

| | | |
|---|---|---|
| CN | 101345852 A | 1/2009 |
| CN | 101819807 A | 9/2010 |

(Continued)

OTHER PUBLICATIONS

Office Action issued in Chinese Application No. 201580085671.5 dated Feb. 3, 2020, 8 pages.

(Continued)

*Primary Examiner* — Eileen M Adams
(74) *Attorney, Agent, or Firm* — Conley Rose, P.C.

(57) ABSTRACT

The present disclosure describes methods, systems, and devices adjusting multimedia playing progress. In one implementation, a method includes playing, by a terminal, a multimedia file; receiving, by the terminal, a user input indicating a fast-forward operation that is for a playing progress of the multimedia file and that is input by a user; obtaining, by the terminal, a fast-forward record of the multimedia file; and automatically adjusting, by the terminal, the playing progress of the multimedia file according to the fast-forward record.

11 Claims, 5 Drawing Sheets

(56) References Cited

U.S. PATENT DOCUMENTS

| | | | | |
|---|---|---|---|---|
| 2009/0313564 A1* | 12/2009 | Rottler | ............... | G11B 27/329 |
| | | | | 715/764 |
| 2013/0007005 A1 | 1/2013 | Chen et al. | | |
| 2014/0363141 A1* | 12/2014 | Bonhomme | ......... | G11B 27/031 |
| | | | | 386/278 |
| 2015/0134673 A1* | 5/2015 | Golan | ................. | G06F 16/739 |
| | | | | 707/748 |

FOREIGN PATENT DOCUMENTS

| | | |
|---|---|---|
| CN | 102467940 A | 5/2012 |
| CN | 103501461 A | 1/2014 |
| CN | 104156165 A | 11/2014 |
| CN | 104284249 A | 1/2015 |
| CN | 104754415 A | 7/2015 |
| CN | 104796781 A | 7/2015 |
| CN | 104822091 A | 8/2015 |
| KR | 100667809 B1 | 1/2007 |

OTHER PUBLICATIONS

Anonymous,"Parsing the MP4 File Format (1)",dated Jul. 15, 2010,total 13 pages with 15 pages English translation.
International Search Report issued in International Application No. PCT/CN2015/100276 dated Nov. 7, 2016, 12 pages.
Office Action issued in Chinese Application No. 201580085671.5 dated Jul. 3, 2019, 8 pages.
Office Action issued in Chinese Application No. 201580085671.5 dated Jun. 4, 2020, 6 pages (with English translation).

* cited by examiner

METHOD FOR ADJUSTING MULTIMEDIA PLAYING PROGRESS

CROSS-REFERENCE TO RELATED APPLICATIONS

This application is a national stage of International Application No. PCT/CN2015/100276, filed on Dec. 31, 2015, which is hereby incorporated by reference in its entirety.

TECHNICAL FIELD

The present invention relates to the field of multimedia playing control, and in particular, to a method for adjusting multimedia playing progress.

BACKGROUND

Browsing a video is common in people's daily life. When browsing the video, a user often adjusts video playing. For example, because the user does not have enough time, the user wants to quickly browse the entire video; alternatively, the user is not interested in currently played video content, and wants to skip the currently played video content, or the like. In this case, the user usually adjusts playing progress of the current video by dragging a playing progress bar, or tapping a fast-forward button, or using a gesture. However, currently the user is aimless in a video playing adjustment method, and the user does not know whether he/she is interested in video content of a corresponding location after playing progress is adjusted. The adjustment method easily makes the user miss some content that he/she is interested in, or makes the user not determine whether to skip content that he/she is interested in. Therefore, this causes the user to drag the playing progress bar back and forth, or drag the playing progress bar many times. Great inconvenience is brought to the user for watching the video, and user experience is affected.

SUMMARY

Embodiments of the present invention provide a method for adjusting multimedia playing progress, so as to optimize an existing problem, and improve user experience of browsing a video.

According to a first aspect, an embodiment of the present invention provides a method for adjusting multimedia playing progress, where the method includes:

playing, by a terminal, a multimedia file;

receiving, by the terminal, a fast-forward operation that is for playing progress of the multimedia file and that is input by a user;

obtaining, by the terminal, a fast-forward record of the multimedia file; and automatically adjusting, by the terminal, the playing progress of the multimedia file according to the fast-forward record.

According to the method provided in the first aspect of the present invention, after detecting the fast-forward operation that is input by the user, the terminal can obtain the fast-forward record, and automatically adjust the playing progress of the multimedia file according to information in the fast-forward record. In the method, when the user triggers the fast-forward operation, a video location of interest can be accurately located according to obtained prior information. This avoids back-and-forth switching of the playing progress by the user, and improves user experience.

With reference to the first aspect, in a first implementation of the first aspect, the obtaining, by the terminal, a fast-forward record of the multimedia file includes:

presetting a fast-forward record in the multimedia file, and obtaining, by the terminal, the fast-forward record by reading file information of the multimedia file; and/or obtaining, by the terminal from a stored fast-forward record, a fast-forward record that is made by the user for the multimedia file; and/or obtaining, by the terminal, a fast-forward record of the multimedia file from a server.

With reference to the first implementation of the first aspect, in a second implementation of the first aspect, the fast-forward record includes time information and a priority, and the time information includes a video location and duration; and the automatically adjusting, by the terminal, the playing progress of the multimedia file according to the fast-forward record includes:

automatically adjusting, by the terminal, the playing progress of the multimedia file to the video location according to the priority in the fast-forward record; or automatically adjusting, by the terminal, the playing progress of the multimedia file to the video location according to current playing progress and the priority in the fast-forward record.

The first implementation of the first aspect of the present invention provides multiple methods for obtaining the fast-forward record, and provides multiple manners of the fast-forward operation, to further improve accuracy and diversity of the fast-forward operation.

With reference to the first or the second implementation of the first aspect, in a third implementation of the first aspect, the fast-forward record further includes a fast-forward category, and the terminal obtains the fast-forward record of the multimedia file according to the fast-forward category.

The fast-forward category classifies video content attributes, and may provide the user with more content information.

With reference to the third implementation of the first aspect, in a fourth implementation of the first aspect, the fast-forward category includes but is not limited to a leading role, a dialogue scene, specific object emergence, and a wonderful scene.

With reference to the first implementation of the first aspect, in a fifth implementation of the first aspect, the fast-forward record is added to the multimedia file by extending a type of a header file.

The multimedia file includes the fast-forward record, and video content information may be added during multimedia production, so that the accuracy of the fast-forward operation is high.

With reference to the first implementation of the first aspect, in a sixth implementation of the first aspect, the server stores fast-forward records that are made by different terminals for the multimedia file and performs analysis; and the terminal obtains an analyzed fast-forward record of the multimedia file from the server.

According to a second aspect, an embodiment of the present invention provides a terminal, where the terminal includes:

a playing module, configured to play a multimedia file;

a receiving module, configured to receive a fast-forward operation that is for playing progress of the multimedia file and that is input by a user;

an obtaining module, configured to obtain a fast-forward record of the multimedia file; and an adjustment module, configured to automatically adjust the playing progress of the multimedia file according to the fast-forward record.

With reference to the second aspect, in a first implementation of the second aspect, the obtaining module is specifically configured to:

obtain the fast-forward record by reading file information of the multimedia file, where a fast-forward record is preset in the multimedia file; and/or obtain, from a stored fast-forward record, a fast-forward record that is made by the user for the multimedia file; and/or obtain a fast-forward record of the multimedia file from a server.

The terminal provided in the second aspect of the present invention can obtain, after detecting the fast-forward operation that is input by the user, the fast-forward record, and automatically adjust the playing progress of the multimedia file according to information in the fast-forward record. The terminal can accurately locate a video location of interest according to obtained prior information when the user triggers the fast-forward operation. This avoids back-and-forth switching of the playing progress by the user, and improves user experience.

With reference to the first implementation of the second aspect, in a second implementation of the second aspect, the fast-forward record includes time information and a priority, and the time information includes a video location and duration; and the adjustment module is specifically configured to:

automatically adjust the playing progress of the multimedia file to the video location according to the priority in the fast-forward record; or automatically adjust the playing progress of the multimedia file to the video location according to current playing progress and the priority in the fast-forward record.

With reference to the first or the second implementation of the second aspect, in a third implementation of the second aspect, the fast-forward record further includes a fast-forward category, and the obtaining module is configured to obtain the fast-forward record of the multimedia file according to the fast-forward category.

With reference to the third implementation of the second aspect, in a fourth implementation of the second aspect, the fast-forward category includes but is not limited to a leading role, a dialogue scene, specific object emergence, and a wonderful scene.

With reference to the first implementation of the second aspect, in a fifth implementation of the second aspect, the fast-forward record is added to the multimedia file by extending a type of a header file.

With reference to the first implementation of the second aspect, in a sixth implementation of the second aspect, the server stores fast-forward records that are made by different terminals for the multimedia file and performs analysis; and the obtaining module is configured to obtain an analyzed fast-forward record of the multimedia file from the server.

According to a third aspect, an embodiment of the present invention provides a terminal, where the terminal includes:

a memory, and a processor, configured to invoke one or more programs stored in the memory to perform the following operations:

playing a multimedia file;

receiving a fast-forward operation that is for playing progress of the multimedia file and that is input by a user;

obtaining a fast-forward record of the multimedia file; and automatically adjusting the playing progress of the multimedia file according to the fast-forward record.

The terminal provided in the third aspect of the present invention can obtain, after detecting the fast-forward operation that is input by the user, the fast-forward record, and automatically adjust the playing progress of the multimedia file according to information in the fast-forward record. The terminal can accurately locate a video location of interest according to obtained prior information when the user triggers the fast-forward operation. This avoids back-and-forth switching of the playing progress by the user, and improves user experience.

With reference to the third aspect, in a first implementation of the third aspect, that the processor is configured to obtain a fast-forward record of the multimedia file includes:

obtaining the fast-forward record by reading file information of the multimedia file, where a fast-forward record is preset in the multimedia file; and/or obtaining, from a stored fast-forward record, a fast-forward record that is made by the user for the multimedia file; and/or obtaining a fast-forward record of the multimedia file from a server.

With reference to the first implementation of the third aspect, in a second implementation of the third aspect, the fast-forward record includes time information and a priority, and the time information includes a video location and duration; and that the processor is configured to automatically adjust the playing progress of the multimedia file according to the fast-forward record includes:

automatically adjusting the playing progress of the multimedia file to the video location according to the priority in the fast-forward record; or automatically adjusting the playing progress of the multimedia file to the video location according to current playing progress and the priority in the fast-forward record.

With reference to the first or the second implementation of the third aspect, in a third implementation of the third aspect, the fast-forward record further includes a fast-forward category, and the processor is configured to obtain the fast-forward record of the multimedia file according to the fast-forward category.

With reference to the third implementation of the third aspect, in a fourth implementation of the third aspect, the fast-forward category includes but is not limited to a leading role, a dialogue scene, specific object emergence, and a wonderful scene.

With reference to the first implementation of the third aspect, in a fifth implementation of the third aspect, the fast-forward record is added to the multimedia file by extending a type of a header file.

With reference to the first implementation of the third aspect, in a sixth implementation of the third aspect, the server stores fast-forward records that are made by different terminals for the multimedia file and performs analysis; and the processor is configured to obtain an analyzed fast-forward record of the multimedia file from the server.

According to the solutions provided in the embodiments of the present invention, the terminal can obtain, after detecting a user operation, an existing fast-forward record, adjust current playing progress of the multimedia file according to prior information in the fast-forward record, and accurately and quickly locate a location corresponding to video content that the user is interested in. This resolves a problem of adjusting playing progress according to a step, and improves user experience.

BRIEF DESCRIPTION OF DRAWINGS

To describe the technical solutions in the embodiments of the present invention more clearly, the following briefly describes the accompanying drawings required for describing the embodiments or the prior art. The accompanying drawings in the following description show merely some embodiments of the present invention, and a person of ordinary skill in the art may still derive other drawings from these accompanying drawings.

DESCRIPTION OF EMBODIMENTS

Figure 1:
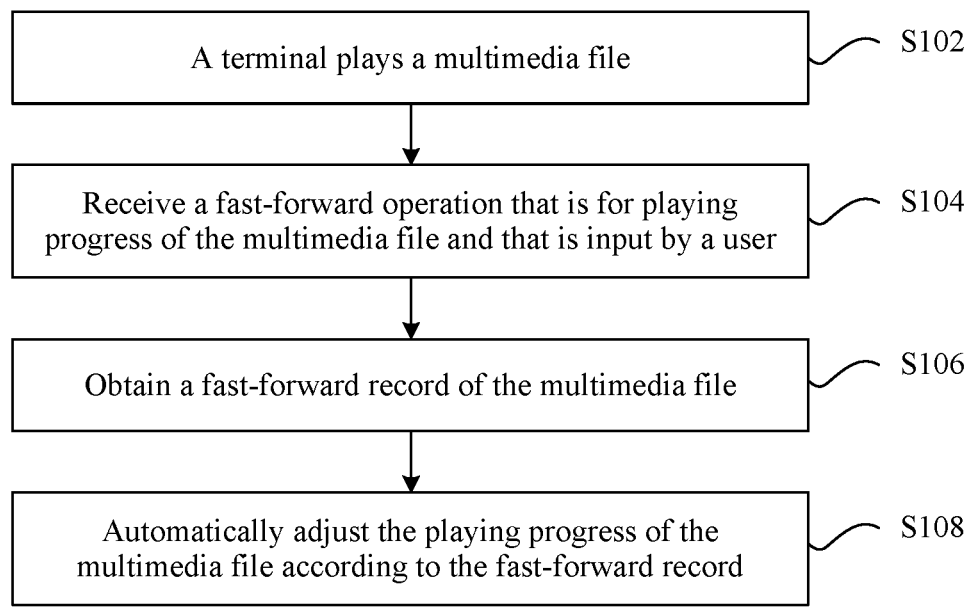
FIG. 1 is a schematic flowchart of a method for adjusting multimedia playing progress according to an embodiment of the present invention.

To make the objectives, technical solutions, and advantages of the present invention clearer, the following further describes the embodiments of the present invention in detail with reference to the accompanying drawings. To understand the present invention, many specific details are mentioned in the following detailed description. However, a person skilled in the art should understand that the present invention may be implemented without these specific details. In other embodiments, well-known methods, processes, components, and circuits are not described in detail, so as to prevent the embodiments from being blurred. Apparently, the described embodiments are some but not all of the embodiments of the present invention. All other embodiments obtained by a person of ordinary skill in the art based on the embodiments of the present invention without creative efforts shall fall within the protection scope of the present invention.

Terms used in the embodiments of the present invention are for the purpose of better describing specific embodiments, but are not intended to limit the present invention. The terms "a", "said" and "the" of singular forms used in the embodiments and the appended claims of the present invention are also intended to include plural forms, unless otherwise specified in the context clearly. In the specification, claims, and accompanying drawings of the present invention, the terms "first", "second", "third", and so on are intended to distinguish between different objects but do not indicate a particular order. It should also be understood that, the term "and/or" used herein indicates and includes any or all possible combinations of one or more associated listed items. It should be further understood that the term "include" used in the specification specifies presence of features, entirety, steps, operations, elements and/or components, without excluding presence or attachment of one or more of other features, entirety, steps, operations, elements, components, and/or their combinations.

Browsing a video by using a terminal is a part of people's daily life. Because video content is numerous, a user usually wants to more quickly locate a video location that he/she is interested in. For example, there is a particularly moving scene in a movie, after opening a video, the user wants to quickly adjust playing progress of the video to a corresponding video location for playing. At present, the user may directly drag a playing progress bar to locate the playing progress to a target location. Alternatively, the user usually may trigger a fast-forward/rewind operation, and browse the video content according to a fast-forward/rewind step, to locate the playing progress to the target location. The playing progress is a location at which a media file is played. The playing progress bar is an indication of the playing progress.

The foregoing method for adjusting video playing enables the user to quickly locate the video location that he/she is interested in. However, at present, the method for adjusting video playing progress is a general method for adjusting all video playing, and is aimless because an adjusted parameter mainly includes an objective parameter such as a step of the video and does not include the video content, and there is no other prior information. Therefore, when locating the video location that he/she is interested in, the user usually needs to drag the playing progress bar many times, or needs to switch the playing progress back and forth during precise locating. This brings inconvenience to the user.

The terminal used in the embodiments of the present invention may be a device that has a multimedia file playing function, such as a mobile phone, a tablet computer, a personal digital assistant (Personal Digital Assistant, PDA for short), a point of sales (Point of Sales, POS for short), or an in-vehicle computer, and this is not specifically limited in the embodiments of the present invention. The terminal used in the embodiments of the present invention may also be a player for playing a multimedia file.

An embodiment of the present invention provides a method for adjusting multimedia playing progress. As shown in FIG. 1, the method includes the following steps.

S102. A terminal plays a multimedia file.

The multimedia file used in this embodiment of the present invention may be a video file, or may be an audio file. The terminal may play the multimedia file by using any compatible player. The player may be a standalone player, or a player that is integrated into another application program, and this is not limited in this embodiment of the present invention. The terminal may also be a player.

S104. The terminal receives a fast-forward operation that is for playing progress of the multimedia file and that is input by a user.

An operation of the user for adjusting the playing progress of the multimedia file may include a fast-forward operation and a rewind operation. Because a basic principle of the rewind operation is similar to that of the fast-forward operation, the fast-forward operation is used for description in this embodiment of the present invention, or the fast-forward operation in the present invention includes the fast-forward operation and the rewind operation.

When playing the multimedia file, the terminal may receive the fast-forward operation that is for the playing progress of the multimedia file and that is input by the user. Specifically, the user may trigger the fast-forward operation by tapping an adjustment button. For example, the user may tap the button by using a mouse, or the user taps the button on a display screen by using a stylus or a finger. Alternatively, the user may trigger the fast-forward operation by using a corresponding gesture on the display screen. For example, the finger of the user slides to the right on a play screen of the display screen to trigger the fast-forward operation. There are many implementations of the fast-forward operation that is for the playing progress of the multimedia file and that is input by the user, and this is not limited in this embodiment of the present invention.

S106. Obtain a fast-forward record of the multimedia file.

In this embodiment of the present invention, the terminal may obtain the fast-forward record of the multimedia file in multiple manners.

In an optional implementation, a fast-forward record related to video content may be preset in the multimedia file. The terminal may obtain the fast-forward record by reading file information of the multimedia file. Optionally, the preset fast-forward record may include a fast-forward category, time information, and a priority. For example, a header (header) file of the multimedia file may include the preset fast-forward category, the time information, and the priority. Optionally, the time information may include a video location and duration. Optionally, the video location may include a start video location and an end video location of the fast-forward record, or may include only the start video location. If the fast-forward record includes only one video location, the video location is the start video location. If the end video location is not described, the video location in this embodiment of the present invention may be the start video location. Optionally, the fast-forward category may be represented by a number or a character. It may be understood that, the preset fast-forward record may further include other information, for example, frequency, that is, a quantity of times the fast-forward record or the video location is selected. Optionally, the terminal may obtain the fast-forward record by reading the header file of the multimedia file.

In another optional implementation, the terminal may also obtain the fast-forward record of the multimedia file from a server. For example, the server in a network may record fast-forward operations of multiple users for the multimedia file and perform analysis, and then store a related fast-forward record in a file.

In another optional implementation, the terminal may also store the fast-forward operation of the user. When the user performs the fast-forward operation on the multimedia file, if the terminal stores the fast-forward record for the multimedia file, the terminal may adjust the playing progress according to the stored fast-forward record.

Optionally, in this embodiment of the present invention, the terminal may have multiple fast-forward manners, that is, multiple fast-forward categories. The terminal may obtain the fast-forward record according to the fast-forward category. The terminal may set the fast-forward category in multiple manners. For example, after triggering the fast-forward operation, the user may select a specific fast-forward category by using a user interface. Optionally, the user may also preset the fast-forward category of the fast-forward operation. For example, the user sets, according to his/her habit, a uniform fast-forward category for all of the fast-forward operations, or sets different fast-forward categories for different fast-forward trigger operations, or sets different fast-forward categories for different categories of multimedia files, and this is not limited in this embodiment of the present invention. If before triggering the fast-forward operation, the user has set the fast-forward category, the terminal may determine the fast-forward category of this fast-forward operation according to the set fast-forward category or a default fast-forward category. The fast-forward category may include: a hero/heroine, specific object emergence that includes a person or others, dialogue emergence, a wonderful scene, and the like. The fast-forward category may be set according to different video content, different videos may have different fast-forward categories, and this is not specifically limited in this embodiment of the present invention.

S108. Automatically adjust the playing progress of the multimedia file according to the fast-forward record.

The fast-forward record, obtained by the terminal according to S106, of the multimedia file may be one fast-forward record, or may be multiple fast-forward records. If the obtained fast-forward record is one fast-forward record, the terminal automatically adjusts the playing progress of the multimedia file to a video location in the fast-forward record, and no further operation of the user is required. The video location herein is a start video location in the fast-forward record. If the obtained fast-forward record is multiple fast-forward records, the terminal may obtain a fast-forward record corresponding to this fast-forward operation according to priorities of the multiple fast-forward records. Optionally, the terminal may also obtain the fast-forward record corresponding to this fast-forward operation with reference to current playing progress and a priority. For example, the terminal first obtains the current playing progress, then obtains a fast-forward record that a video location is within a threshold interval range of the playing progress in the fast-forward record, and finally obtains the fast-forward record corresponding to this fast-forward operation according to the priority of the fast-forward record within the threshold interval range. After obtaining the fast-forward record corresponding to this fast-forward operation, the terminal automatically adjusts the playing progress of the multimedia file to the video location in the fast-forward record.

Optionally, if the obtained fast-forward record is the multiple fast-forward records, the terminal also prompts the user on a current play screen by using a form of a small window. The user may select, according to prompt content, the video location of the playing progress that needs to be adjusted. For example, the user taps a corresponding small window, and adjusts the playing progress to a location corresponding to the small window. Optionally, the small window may display a picture of the video location, or may display the video location in a video playing manner. This manner provides the user with flexibility for selection.

The foregoing obtaining the fast-forward record corresponding to this fast-forward operation may also be the step in S106. In S108, the terminal only needs to automatically adjust the playing progress of the multimedia file to the video location in the fast-forward record.

According to the method for adjusting multimedia playing progress shown in FIG. 1, after detecting the fast-forward operation that is input by the user, the fast-forward record, the terminal can obtain the fast-forward record, and automatically adjust the playing progress of the multimedia file according to information in the fast-forward record. In the method, when the user triggers the fast-forward operation, a video location of interest can be accurately located according to obtained prior information. This avoids back-and-forth switching of the playing progress by the user, and improves user experience.

The following uses a video file as an example to describe in detail the method provided in this embodiment of the present invention.

The user first opens the video file before browsing a video. If the user is not interested in current video content, the user may skip the current video content by using the fast-forward operation, and switch to video content corresponding to another video location for playing. Specifically, the user may trigger the fast-forward operation on a touchscreen by using a gesture, or trigger the fast-forward operation by tapping a fast-forward button, and this is not limited in this embodiment of the present invention.

In a first optional implementation, the terminal may perform the fast-forward operation by using the fast-forward record in the video file.

A fast-forward record related to the video content may be added to the video file. For example, a video producer or editor may add a fast-forward record shown in the following Table 1 to the video file.

TABLE 1

| Fast-forward category | Video location | Duration | Priority |
|---|---|---|---|
| Hero | 01:20 | 02:00 | 2 |
| | 05:30 | 03:00 | 1 |
| | . . . | . . . | |
| Person emergence | 01:00 | 02:00 | 3 |
| | 04:01 | 06:00 | 1 |
| | . . . | . . . | |
| . . . | . . . | . . . | |

The fast-forward category may be extended according to the user requirement or a feature of the video content. For example, the fast-forward category may further include an actor/actress, such as a leading role, a specific object such as a thing, a wonderful plot, dialogue emergence, and the like. The priority may be related to sorting of the duration, for example, longer duration indicates a higher priority; or the priority is related to an importance degree of an object that emerges at a corresponding video location, for example, a priority of a location at which the hero/heroine emerges is higher than that of another person; or the priority may be set according to another policy, for example, a wonderfulness degree of video content at a corresponding location. More wonderful video content indicates a higher priority. A priority policy of each video file may be different from that of another video file, and determining of the priority is not specifically limited in this embodiment of the present invention.

Optionally, the user may select the fast-forward category. If the user selects the fast-forward category by using a user interface, the terminal may consider only a fast-forward record that belongs to the fast-forward category, and no longer consider a fast-forward record of another fast-forward category.

The following uses an encapsulation format of an MP4 video file as an example to further describe the method in FIG. 1 according to this embodiment of the present invention. A standard corresponding to the encapsulation format of the MP4 video file used in this embodiment of the present invention is ISO/IEC 14496-12, that is, information technology coding of audio-visual objects Part 12: ISO base media file format (Information technology Coding of audio-visual objects Part 12: ISO base media file format). A standard designated by the ISO/IEC organization is generally represented by a number, and ISO/IEC 14496 is the MPEG-4 standard. The encapsulation format of the video file in this embodiment of the present invention is used merely as an example for description, and does not constitute a limitation on the present invention, and the method provided in this embodiment of the present invention is also applicable to another standard.

Figure 2A:
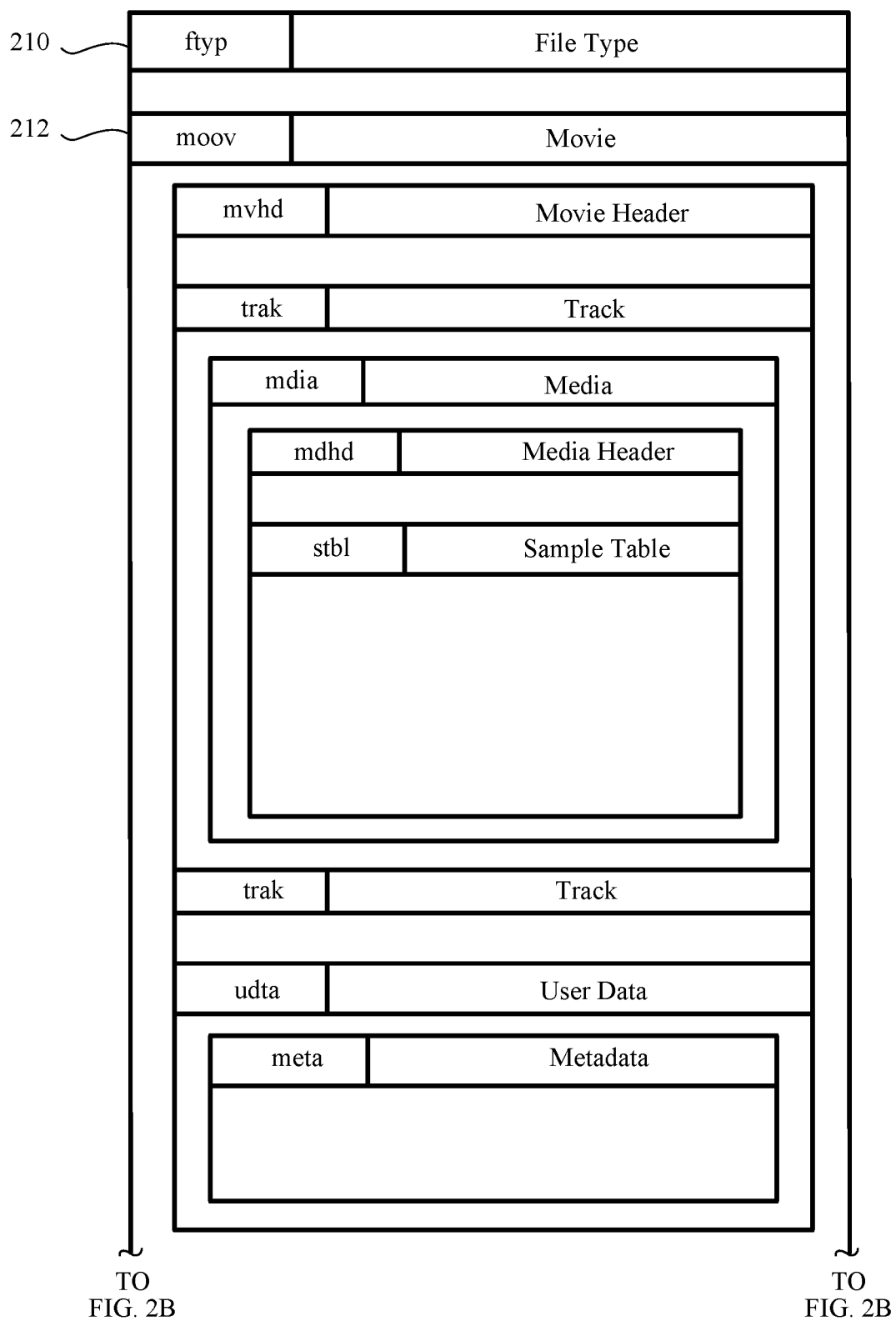
FIG. 2A and FIG. 2B are a schematic structural diagram of a video file according to an embodiment of the present invention.
Figure 2B:
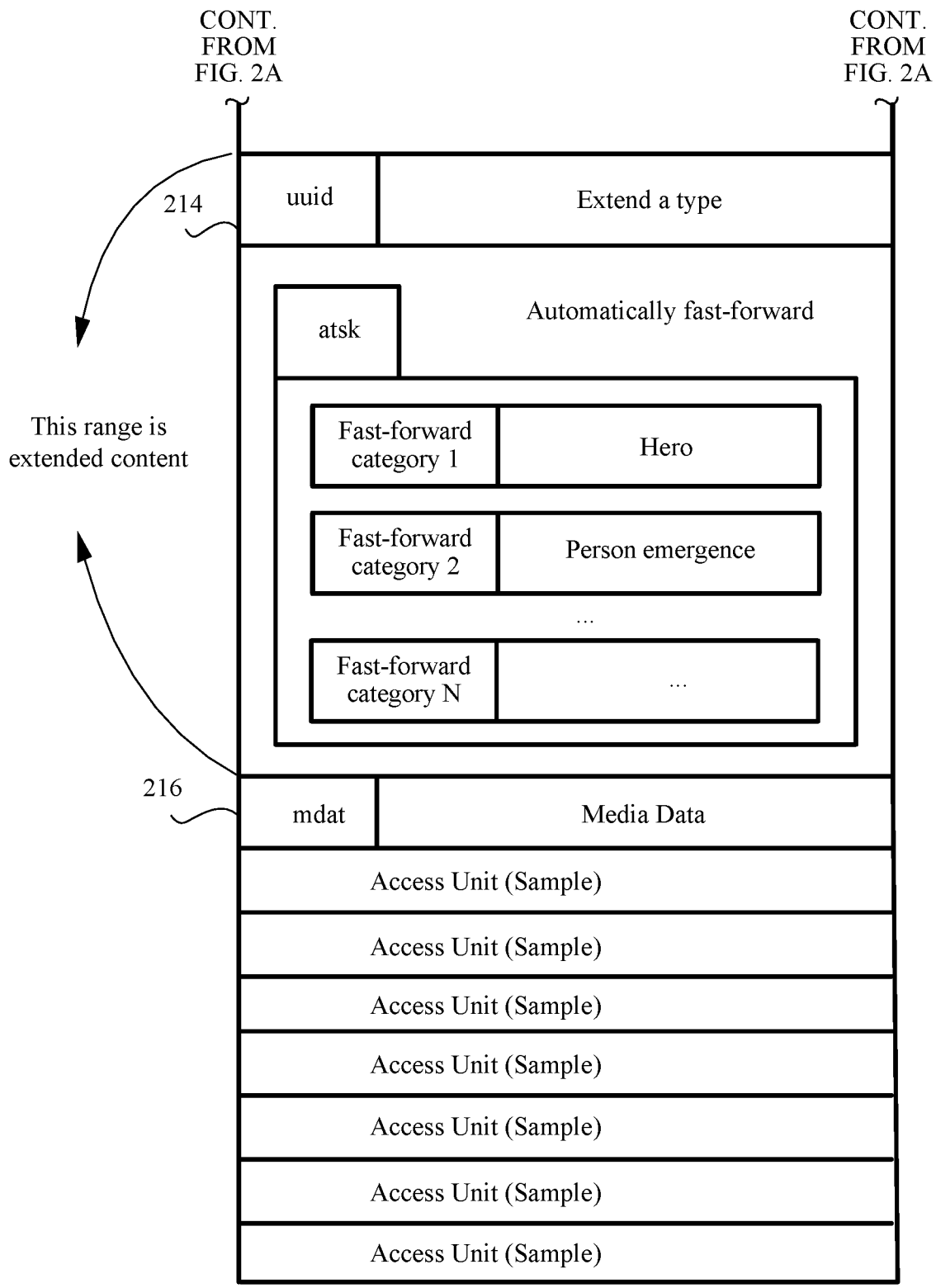

The encapsulation format of the MP4 video file is defined based on a QuickTime container format. All data in the MP4 file is placed in a box, and corresponds to an atom in the QuickTime. That is, the MP4 file includes several boxes, each box has a corresponding type and length, and a box may be understood as a data object block. The box may include another box, and the another box is referred to as a container box. As shown in FIG. 2A and FIG. 2B, one MP4 file has one and only one "ftyp" type of box 210, and the box 210 is used as a flag of an MP4 format and includes some information about the file. One MP4 file has one and only one "moov" type of box 212 (Movie Box), the box 212 is a container box, and a sub box includes metadata information of media. Media data of the MP4 file is included in a "mdat" type of box 216 (Media Data Box), and the type of box is also a container box. One MP4 file may have multiple boxes 216, or may have no box 216 when all of the media data references another file, and a structure of the media data is described by Metadata.

Optionally, the video producer or editor may add the foregoing fast-forward record to the header (header) file of the video file. Optionally, the video producer or editor may add the fast-forward record to the middle or the tail of the header file of the video file by extending a type of the header file. For example, for the video file of the MP4 format, a type of fast-forward such as a type named atsk may be added to a uuid type of box 214, and the foregoing fast-forward record may be added to a corresponding part of this type, as shown in FIG. 2A and FIG. 2B. An added content format is shown in the following Table 2.

TABLE 2

| Field | Quantity of bytes | Content |
|---|---|---|
| Box size | 4 | Box size |
| Box type | 4 | Box type, that is, atsk |
| Version | 1 | Box version, 0 or 1, generally 0 |
| Flags | 3 | Flag |
| Creation time | 4 | Creation time |
| Modification time | 4 | Modification time |
| Fast-forward category 1 | Not limited | Hero, a quantity of sub boxes |
| Fast-forward category 2 | Not limited | Person emergence, a quantity of sub boxes |
| . . . | . . . | . . . |

A sub box may be added to the atsk box according to the fast-forward category, as shown in the following Table 3.

TABLE 3

| Field | Quantity of bytes | Meaning |
|---|---|---|
| Box size | 4 | Box size |
| Box type | 4 | Box type: a hero |
| Version | 1 | Box version, 0 or 1, generally 0 |
| Flags | 3 | Flag |
| Creation time | 4 | Creation time |
| Modification time | 4 | Modification time |
| Emergence time | Not limited | 01:20 |
| Duration | Not limited | 02:00 (minute:second) |
| Priority | 4 | 2 |

The foregoing Table 3 uses an example in which the fast-forward category is a hero for description.

It may be understood that, the atsk is merely an example name, the fast-forward category may also be another user-defined or identifiable name, and this is not limited in this embodiment of the present invention.

The quantity of the sub boxes that emerges needs to be consistent with a quantity of boxes that is set in a "fast-forward category" item in the atsk box. Optionally, the foregoing creation time may be a quantity of seconds that is relative to UTC time 1904-01-01 zero o'clock, and this is not limited in this embodiment of the present invention.

Figure 3:
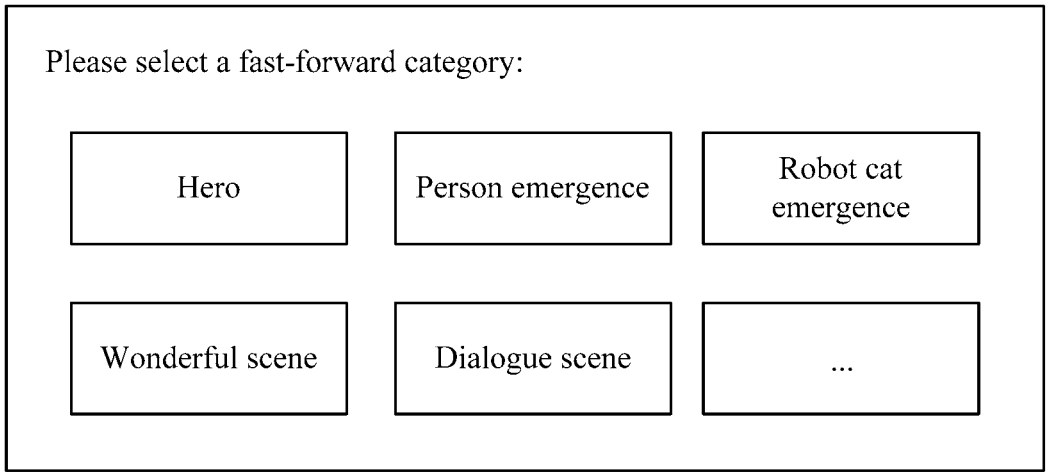
FIG. 3 is a schematic diagram of user interface selection according to an embodiment of the present invention.

If the video file includes the foregoing fast-forward record, after triggering the fast-forward operation, the user may select the fast-forward category by using a user interface shown in FIG. 3. The user interface for selecting the fast-forward category shown in FIG. 3 corresponds to the fast-forward category that is added to the video file. It may be understood that, the user may also set the default fast-forward category in the player, and the user does not need to select the fast-forward category when performing the fast-forward operation each time. Related content has been described in S106, and details are not described herein again.

In a second optional implementation, the terminal may store a fast-forward record of the user, which is also referred to as data of the fast-forward operation. After the user triggers the fast-forward operation, the terminal may store the fast-forward record in a file of the terminal, or upload the fast-forward record to the server for storage. If the terminal stores a fast-forward record related to a current video file, after the user triggers the fast-forward operation, the terminal may adjust current playing progress of the video file according to the fast-forward record. For example, the user has watched the video file last time, and used the fast-forward operation, and the terminal may store the fast-forward record. When the user browses the video file again, if the user triggers the fast-forward operation, the user may first obtain the fast-forward record, and adjust the current playing progress according to the fast-forward record.

Specifically, a format of the fast-forward record may be shown in the following Table 4.

TABLE 4

| | |
|---|---|
| Video location | 01:20, 05:30, . . . |
| Duration | 02:00, 03:00, . . . |
| Priority | 2, 1, . . . |

Table 4 shows a sequential correspondence, that is, (01:20, 02:00, 2) is used as one group (the video location, the duration, and the priority) of information and is one fast-forward record.

The terminal may record all of the fast-forward records. Optionally, the terminal may also set a duration threshold, and record only a fast-forward record whose playing duration is greater than the duration threshold. For example, the terminal may set the duration threshold to 10 seconds, and record the data of the fast-forward operation only when the playing duration of the fast-forward operation is greater than 10 seconds. The playing duration of the fast-forward operation is a continuous playing time from the video location, that is, a start location after fast-forward, to a next fast-forward operation or an end of playing. For example, the user first fast-forwards to 10:00, and then continuously plays until 15:00. At 15:00, the user directly drags the progress bar or triggers another fast-forward operation, and fast-forwards the video file to a location of 18:00 for playing. A video location of the first fast-forward is 10:00, and duration is 5:00.

Optionally, the priority of the fast-forward record may be determined according to the duration and/or the frequency of each record. For example, there are several types of duration: A, B, C, D, E, and F, and F is the longest duration and A is the shortest duration. The priority has three types: 1, 2, and 3, and 1 is the highest, 2 is the middle, and 3 is the lowest. Therefore, A and B may be allocated to the priority 3, C and D may be allocated to the priority 2, and E and F may be allocated to the priority 1. For another example, there are several types of fast-forwarded frequency: a, b, c, d, e, and f, f has the highest frequency, that is, the largest quantity of times of being browsed, and a has the lowest frequency, that is, the smallest quantity of times of being browsed. The priority has three levels: 1, 2, and 3, and 1 is the highest, 2 is the middle, and 3 is the lowest. Therefore, a and b may be allocated to the priority 3, c and d may be allocated to the priority 2, and e and f may be allocated to the priority 1. The foregoing priority may also be divided by setting a threshold, for example, multiple duration thresholds are set. When the duration of the fast-forward record is greater than a first duration threshold, the priority is 1; and when the duration of the fast-forward record is greater than a second duration threshold and is less than the first duration threshold, the priority is 2; and so on. Dividing the priority according to the frequency is similar to dividing the priority according to the duration, and details are not described herein again. It may be understood that, the priority may also be divided with reference to both the duration and the frequency, for example, when the duration of the fast-forward record is greater than the duration threshold and the frequency is greater than a frequency threshold, the priority is 1, and so on.

Optionally, when triggering the fast-forward operation, in addition to considering the priority, the terminal may also perform the fast-forward operation with reference to a relationship between the current playing progress of the video file and the video location in the fast-forward record. For example, the current playing progress of the video file is 10:00, that is, a currently played video location is 10:00, and the priority may be increased if a time difference between the video location of the fast-forward record and the currently played video location is within a threshold range. Alternatively, the terminal first screens a fast-forward record that meets a condition that the time difference is within the threshold range, and then performs the fast-forward operation according to the priority in the fast-forward record. For example, the threshold range is 5:00, and a start video location of the fast-forward record whose time difference is within the threshold range should be located between 5:00 and 15:00. Alternatively, a priority of the fast-forward record whose start video location is located between 5:00 and 15:00 is increased. There may be multiple other execution manners of implementing the solution, and this is not limited in this embodiment of the present invention.

In a third optional implementation, the terminal may also obtain the fast-forward record from the server.

The server may collect statistics on the fast-forward records of different terminals and perform analysis, such as big data analysis or classification and integration. When the user triggers the fast-forward operation for a currently browsed video file, the terminal may obtain the fast-forward record stored in the server, and adjust the current playing progress of the video file according to the obtained fast-forward record.

For example, the server may collect statistics on fast-forward operations of various users browsing the video file, collect statistics on and rank video locations in which various users perform fast-forward each time, and duration, and then allocate various video segments to different priorities according to duration of various fast-forward records or frequency of the video location at which fast-forward is performed. Statistical information of the fast-forward record, for example, the video location, the duration, a ranking, and the priority, is recorded in a database of the server. When the user browses the video and triggers the fast-forward operation, the terminal downloads the statistical information from the server, and automatically performs fast-forward based on the statistical information. Optionally, the server may also screen out information with a relatively low rank.

TABLE 5

| Video location | 01:20, 05:30, . . . |
|---|---|
| Duration | 02:00, 03:00, . . . |
| Priority | 2, 1, . . . |

A fast-forward record in the foregoing Table 5 is a sequential correspondence, that is, (01:20, 02:00, 2) is used as one group (the video location, the duration, and the priority) of fast-forward record. The foregoing fast-forward record may be recorded in a file of the server, for example, a text file or the database.

If the fast-forward record reported to the server includes the fast-forward category, for example, a hero, and person emergence, like the first implementation, update may be performed based on the statistical information of the foregoing fast-forward record, and information about the fast-forward category is added. Then big data analysis or classification and integration is performed on a fast-forward record collected by the server, to obtain a fast-forward record shown in the following Table 6.

TABLE 6

| Fast-forward category | Video location | Duration | Priority |
|---|---|---|---|
| Hero | 01:20 | 02:00 | 2 |
|  | 05:30 | 03:00 | 1 |
|  | . . . | . . . |  |
| Person emergence | 01:00 | 02:00 | 3 |
|  | 04:01 | 06:00 | 1 |
|  | . . . | . . . |  |
| . . . | . . . | . . . |  |

Optionally, the priority of the fast-forward record may be determined according to the duration and/or the frequency of each record, or may be determined with reference to the fast-forward category, for example, a priority of the leading role is high. Optionally, when triggering the fast-forward operation, in addition to considering the priority, the terminal may also perform the fast-forward operation with reference to a relationship between the current playing progress of the video file and the video location in the fast-forward record. For related content, refer to a corresponding part of the second implementation, and details are not described herein again.

It may be understood that the method provided in this embodiment of the present invention may include all of the foregoing three implementations. The terminal may preset priorities of the three implementations. For example, the user may set the priority of the second implementation to the highest, that is, the terminal may first obtain a stored fast-forward record of the user, set the priority of the first implementation to the middle, that is, the terminal obtains the fast-forward record from the video file, and set the priority of the third implementation to the lowest, that is, the terminal obtains the fast-forward record related to the video file from the server.

Optionally, after the user triggers one fast-forward operation of multimedia playing, the terminal may also trigger multiple automatic adjustments of the playing progress of the multimedia file. For example, the terminal may first adjust the playing progress to a first video location, after playing corresponding duration, then adjust the playing progress to a second video location, and play duration corresponding to the second video location, and so on. For example, if the fast-forward category is the hero, after opening the video file, the user triggers the fast-forward operation. The terminal may obtain fast-forward records related to the hero from the fast-forward record of the video file, separately obtain video locations and duration of these fast-forward records, and perform multiple adjustments on the playing progress of the video file according to the obtained video locations and duration. Optionally, the terminal may extend the fast-forward record. One fast-forward record includes multiple video locations and corresponding duration. If the terminal adjusts the playing progress according to the fast-forward record, after the user triggers one fast-forward operation, multiple fast-forwards may be automatically implemented for the multimedia file.

It may be understood that, the method shown in FIG. 1 may be a method in the fast-forward operation. When playing the multimedia file and triggering the fast-forward operation, the user may select the method shown in FIG. 1 for adjusting the multimedia playing progress, or may not select the method. Alternatively, after triggering the method shown in FIG. 1, the user may cancel execution of the method shown in FIG. 1 any time by using a preset operation, and this is not limited in this embodiment of the present invention.

According to the foregoing method provided in this embodiment of the present invention, the terminal can obtain, after detecting a user operation, an existing fast-forward record, adjust current playing progress of the multimedia file according to prior information in the fast-forward record, and accurately and quickly locate a location corresponding to video content that the user is interested in. This resolves a problem of adjusting playing progress according to a step, and improves user experience.

Figure 4:
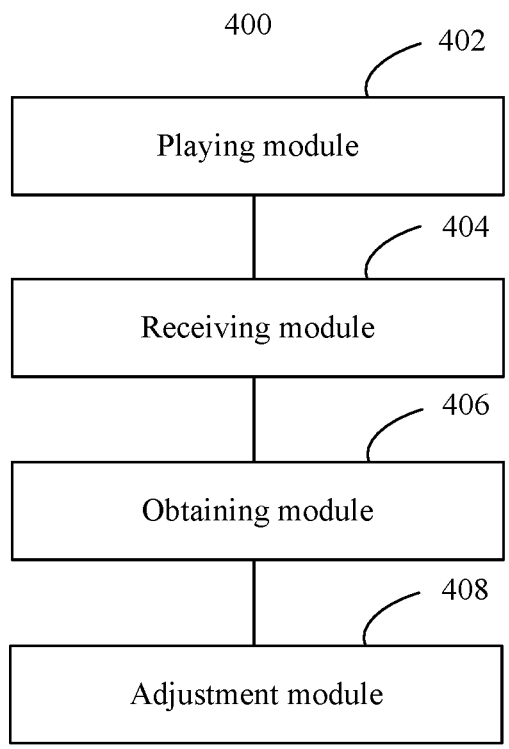
FIG. 4 is a schematic structural diagram of a terminal according to an embodiment of the present invention.

Referring to FIG. 4, an embodiment of the present invention provides a terminal 400, so as to implement a method shown in FIG. 1. All solutions and features implemented in FIG. 1 are applicable to this embodiment, and details are not described herein again.

Specifically, the terminal 400 may include:

a playing module 402, configured to play a multimedia file;

a receiving module 404, configured to receive a fast-forward operation that is for playing progress of the multimedia file and that is input by a user;

an obtaining module 406, configured to obtain a fast-forward record of the multimedia file; and an adjustment module 408, configured to automatically adjust the playing progress of the multimedia file according to the fast-forward record.

Referring to description in FIG. 1, the obtaining module 406 is specifically configured to:

obtain the fast-forward record by reading file information of the multimedia file, where a fast-forward record is preset in the multimedia file; and/or obtain, from a stored fast-forward record, a fast-forward record that is made by the user for the multimedia file; and/or obtain a fast-forward record of the multimedia file from a server.

For a specific method for obtaining the fast-forward record by the obtaining module 406, refer to FIG. 1 and related description of FIG. 1, and details are not described herein again.

Optionally, the fast-forward record may include time information and a priority, and the time information includes a video location and duration. The video location may include a start video location and an end video location. If the fast-forward record includes only one video location, the video location is the start video location.

Specifically, the adjustment module 408 is specifically configured to:

automatically adjust the playing progress of the multimedia file to the video location according to the priority in the fast-forward record; or automatically adjust the playing progress of the multimedia file to the video location according to current playing progress and the priority in the fast-forward record.

For a specific method for adjusting the playing progress by the adjustment module, refer to specific description of three optional implementations in FIG. 1 in which a video file is used as an example, and details are not described herein again.

Optionally, the fast-forward record may include multiple fast-forward categories, and the terminal may obtain the fast-forward record according to the fast-forward categories.

For the fast-forward category, a structure of the multimedia file, and methods for obtaining the fast-forward record and adjusting the playing progress by the terminal, and the like, refer to FIG. 1 and related description of FIG. 1. All solutions and features that can be implemented in FIG. 1 are applicable to the terminal shown in FIG. 4, and details are not described herein again.

Optionally, the playing module 402 may be a display screen of the terminal, or a processor and the display screen, that is, a controller controls playing of the multimedia file, and the display screen displays content of the played multimedia file. The receiving module 404 may be an input device of the terminal, for example, may be the display screen, or may be another input device, for example, a mouse or a stylus. The obtaining module 406 and the adjustment module 408 may be a processor of the terminal.

The terminal 400 shown in FIG. 4 can obtain, after detecting the fast-forward operation that is input by the user, the fast-forward record, and automatically adjust the playing progress of the multimedia file according to information in the fast-forward record. The terminal can accurately locate a video location of interest according to obtained prior information when the user triggers the fast-forward operation. This avoids back-and-forth switching of the playing progress by the user, and improves user experience.

Figure 5:
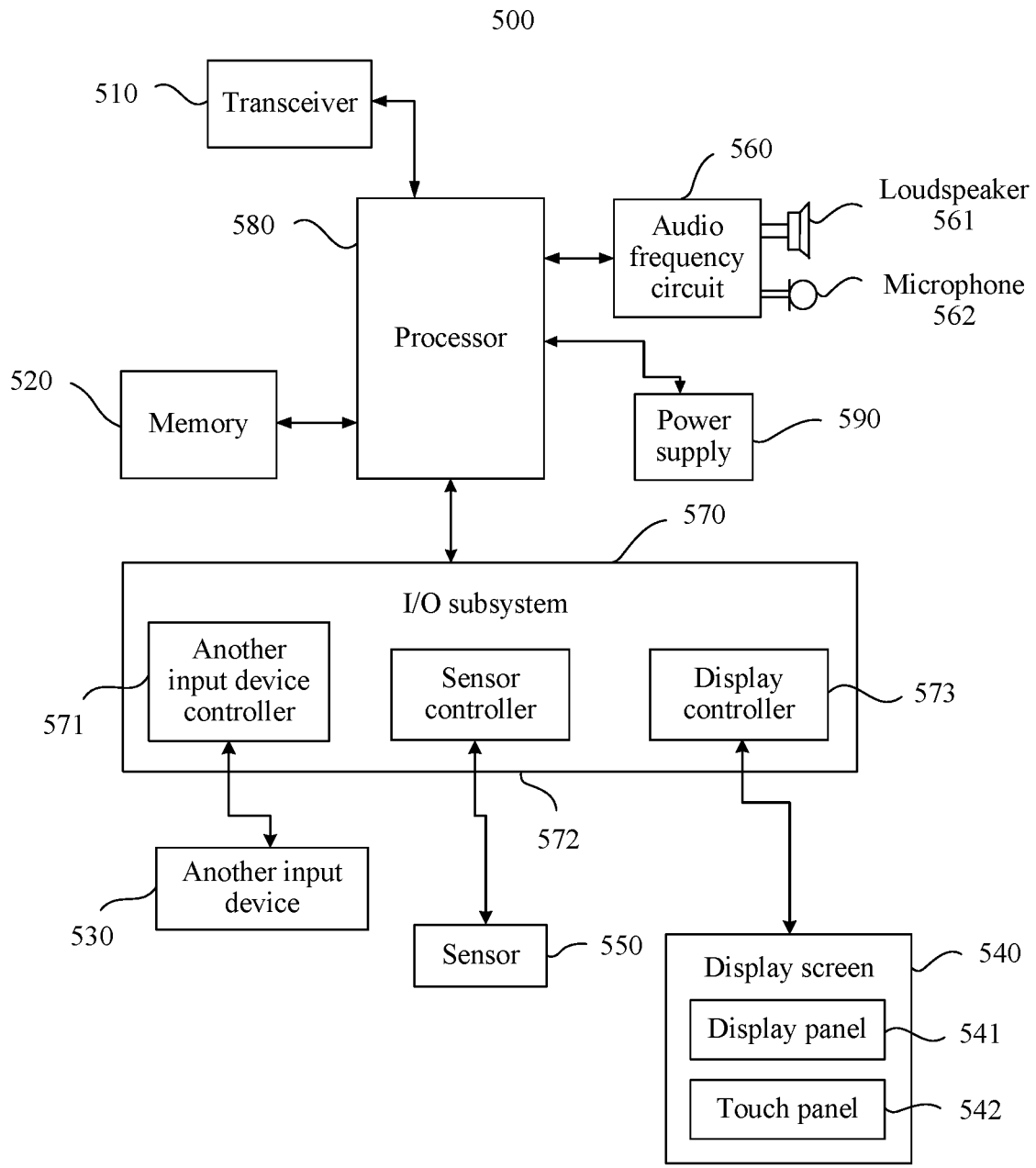
FIG. 5 is a schematic structural diagram of hardware of another terminal according to an embodiment of the present invention.

Referring to FIG. 5, the present invention further provides a terminal for implementing a method provided in an embodiment of the present invention. FIG. 5 shows a block diagram of a partial structure of a terminal 500 according to this embodiment of the present invention. Referring to FIG. 5, the terminal 500 includes parts such as a transceiver 510, a memory 520, another input device 530, a display screen 540, a sensor 550, an audio frequency circuit 560, an I/O subsystem 570, a processor 580, and a power supply 590. A person skilled in the art may understand that a structure of a mobile terminal shown in FIG. 5 constitutes no limitation on the mobile terminal, and may include more or fewer parts than those shown in the figure, or combine some parts, or split some parts, or have a different part arrangement.

The following describes each composition part of the terminal 500 in detail with reference to FIG. 5.

The transceiver 510 may be configured to receive and send a signal, and implement interaction with a network. The transceiver 510 may interact with the network in a wired or wireless manner, and access data in a server.

The memory 520 may be configured to store a software program and a module, and the processor 580 executes various functional applications of the terminal 500 and data processing by running the software program and the module stored in the memory 520. The memory 520 may mainly include a program storage area and a data storage area, where the program storage area may store an operating system, an application program (such as a sound playing function or an image playing function) that is required by at least one function, and the like; and the data storage area may store data (such as audio data or a phonebook) that is created according to use of the terminal 500, and the like. In addition, the memory 520 may include a high-speed random access memory, and may further include a non-volatile memory, for example, at least one magnetic disk storage component, a flash memory component, or another volatile solid-state storage component.

The another input device 530 may be configured to receive an input number or character information, and generate a key signal input related to user settings and function control of the terminal 500. Specifically, the another input device 530 may include but is not limited to one or more of a physical keyboard, a function key (such as a volume control key or an on/off key), a trackball, a mouse, a joystick, an optical mouse (the optical mouse is a touch-sensitive surface that does not display a visual output, or an extension of the touch-sensitive surface formed by a touchscreen), or the like. The another input device 530 is connected to an another input device controller 571 of the I/O subsystem 570, and performs signal interaction with the processor 580 under control of the another device input controller 571.

The display screen 540 may be configured to display information that is input by a user or information provided for the user, and various menus of the terminal 500, and may further receive a user input. Specifically, the display screen 540 may include a display panel 541 and a touch panel 542. The display panel 541 may use a form of an LCD (Liquid Crystal Display, liquid crystal display), an OLED (Organic Light-Emitting Diode, organic light-emitting diode), or the like, to configure the display panel 541. The touch panel 542, also referred to as a touchscreen, a touch-sensitive screen, or the like, may collect a touch or non-touch operation (such as an operation performed by the user on or near the touch panel 542 by using any appropriate object or accessory, such as a finger or a stylus, and may also include a somatosensory operation; and the operation includes a single-point control operation, a multipoint control operation, and the like) of the user on or near the touch panel 542, and drive a corresponding connection apparatus according to a preset program. Optionally, the touch panel 542 may include two parts: a touch detection apparatus and a touch controller. The touch detection apparatus detects a touch orientation and a posture of the user, detects a signal brought by the touch operation, and sends the signal to the touch controller. The touch controller receives touch information from the touch detection apparatus, converts the touch information into information that can be processed by the processor, and then sends the information to the processor 580, and can receive and execute a command sent by the processor 580. In addition, the touch panel 542 may be implemented by using multiple types such as a resistive type, a capacitive type, infrared, and a surface acoustic wave. Further, the touch panel 542 may cover the display panel 541, and the user may perform an operation on or near the touch panel 542 that covers the display panel 541 according to displayed content of the display panel 541 (the displayed content includes but is not limited to a soft keyboard, a virtual mouse, a virtual key, an icon, and the like). After the touch panel 542 detects the operation on or near the touch panel 542, the touch panel 542 sends the operation to the processor 580 by using the I/O subsystem 570 to determine the user input, and then the processor 580 provides, according to the user input, a corresponding visual output on the display panel 541 by using the I/O subsystem 570. Although the touch panel 542 and the display panel 541 in FIG. 5 are used as two independent parts to implement input and input functions of the terminal 500, in some embodiments, the touch panel 542 and the display panel 541 may be integrated to implement the input and output functions of the terminal 500.

The terminal 500 may further include at least one type of sensor 550, such as a light sensor, a motion sensor, and another sensor. Specifically, the light sensor may include an ambient light sensor and a proximity sensor. The ambient light sensor may adjust luminance of the display pane 541 according to brightness of ambient light. The proximity sensor may turn off the display panel 541 and/or backlight when the terminal 500 moves to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. For other sensors such as a gyroscope, a barometer, a hygrometer, a thermometer, and an infrared sensor that may also be configured on the terminal 500, details are not described herein.

The audio frequency circuit 560, a loudspeaker 561, and a microphone 562 may provide audio interfaces between the user and the terminal 500. The audio frequency circuit 560 may transmit, to the loudspeaker 561, a signal converted from received audio data, and the loudspeaker 561 converts the signal into a sound signal for output. On the other hand, the microphone 562 converts a collected sound signal into a signal. After being received by the audio frequency circuit 560, the signal is converted into audio data; and the audio data is output to an RF circuit 108 for sending to, for example, another mobile terminal, or the audio data is output to the memory 520 for further processing.

The I/O subsystem 570 is configured to control an input/output peripheral, and may include the another device input controller 571, a sensor controller 572, and a display controller 573. Optionally, one or more another input device controllers 571 receive a signal from the another input device 530 and/or send a signal to the another input device 530, and the another input device 530 may include a physical button (such as a press button or a rocker button), a dial pad, a slider switch, the joystick, and a click scroll wheel, and the optical mouse (the optical mouse is the touch-sensitive surface that does not display the visual output, or the extension of the touch-sensitive surface formed by the touchscreen). It should be noted that the another input device controllers 571 may connect to any one or more of the foregoing devices. The display controller 573 in the I/O subsystem 570 receives a signal from the display screen 540 and/or sends a signal to the display screen 540. After the display screen 540 detects the user input, the display controller 573 converts the detected user input into interaction between the user and a user interface object displayed on the display screen 540, that is, implements human-machine interaction. The sensor controller 572 may receive a signal from one or more sensors 550 and/or send a signal to the one or more sensors 550.

The processor 580 is a control center of the terminal 500, connects to various parts of the entire mobile terminal by using various interfaces and cables, and by running or executing a software program and/or a module that is stored in the memory 520 and invoking data stored in the memory 520, performs various functions of the terminal 500 and processes data, so as to perform overall monitoring on the mobile terminal. Optionally, the processor 580 may include one or more processing modules. Preferably, the processor 580 may integrate an application processor and a modem processor. The application processor mainly processes an operating system, a user interface, an application program, and the like; and the modem processor mainly processes wireless communications. It may be understood that, the modem processor may not be integrated into the processor 580.

The terminal 500 further includes the power supply 590 (such as a battery) that supplies power to each part. Preferably, the power supply may be logically connected to the processor 580 by using a power supply management system. In this way, functions such as management of charging, discharging, and power consumption are implemented by using the power supply management system.

Although not shown in FIG. 5, the terminal 500 may further include a camera, a Bluetooth module, a Wireless Fidelity (Wireless-Fidelity, Wi-Fi or WiFi) module, and the like, and details are not described herein.

FIG. 5 is a general structural block diagram of the mobile terminal, and it may be understood that, different mobile terminals may include more or fewer structures in FIG. 5. For example, the mobile terminal may further include structures such as the Bluetooth module, the WiFi module, and an infrared module.

The terminal shown in FIG. 5 may be configured to implement the foregoing method in FIG. 1. All solutions and features implemented in FIG. 1 are applicable to this embodiment, and details are not described herein again.

Specifically, a processor 580 may invoke one or more programs stored in the memory 520 to perform the following operations:

playing a multimedia file;
receiving a fast-forward operation that is for playing progress of the multimedia file and that is input by a user;
obtaining a fast-forward record of the multimedia file; and
automatically adjusting the playing progress of the multimedia file according to the fast-forward record.

Specifically, the user may input the fast-forward operation for the multimedia file by using the display screen 540 or the another input device 530.

It may be understood that, the processor 580 plays the multimedia file by controlling a media player, and displays the multimedia file by using the display screen 540.

The processor 580 may obtain the fast-forward record of the multimedia file by using three implementations in an embodiment shown in FIG. 1, and this is briefly described as follows:

The processor 580 may obtain the fast-forward record by reading file information of the multimedia file, where a fast-forward record is preset in the multimedia file; and/or the processor 580 may obtain, from a stored fast-forward record, a fast-forward record that is made by the user for the multimedia file; and/or the processor 580 may obtain a fast-forward record of the multimedia file from a server.

For content in which the processor 580 obtains the fast-forward record, refer to description in FIG. 1, and details are not described herein again.

Optionally, the fast-forward record may include a fast-forward category. The processor 580 may be configured to obtain the fast-forward record of the multimedia file according to the fast-forward category.

For the fast-forward category, a structure of the multimedia file, and methods for obtaining the fast-forward record and adjusting the playing progress by the processor 580, and the like, refer to FIG. 1 and related description of FIG. 1. All solutions and features that can be implemented in FIG. 1 are applicable to the terminal shown in FIG. 5, and details are not described herein again.

It may be understood that, the terminal 500 may also be a multimedia player.

The terminal 500 shown in FIG. 5 can obtain, after detecting the fast-forward operation that is input by the user, the fast-forward record, and automatically adjust the playing progress of the multimedia file according to information in the fast-forward record. The terminal can accurately locate a video location of interest according to obtained prior information when the user triggers the fast-forward operation. This avoids back-and-forth switching of the playing progress by the user, and improves user experience.

It should be understood that, in all the embodiments of this specification, as shown in FIG. 5, the terminal generally includes at least one processor (such as a CPU), at least one transceiver, and at least one bus. The processor is a control center of an electronic device and is connected to various parts of the entire electronic device by using various interfaces and cables; and by running or executing a software program and/or a module stored in a storage unit and invoking data stored in the storage unit, performs various functions of the electronic device and/or processes data. The processor may include an integrated circuit (Integrated Circuit, IC for short), for example, may include a single encapsulated IC, or may include multiple encapsulated ICs that have a same function or different functions. For example, the processor may include only a central processing unit (Central Processing Unit, CPU for short), and may also be a combination of a GPU, a digital signal processor (Digital Signal Processor, DSP for short), and a control chip (for example, a baseband chip) in a communications unit. In the implementations of the present invention, the CPU may be a single computing core, or may include multiple computing cores.

It should be noted that, in a specific implementation process, a person skilled in the art should understand that, in addition to the structure shown in FIG. 5, the terminal 500 further includes another component required for implementing normal running. Furthermore, a person skilled in the art should understand that, according to a specific requirement, the terminal 500 may further include a hardware component that implements another additional function. In addition, a person skilled in the art should understand that the terminal 500 may also include only a component required for implementing the embodiments of the present invention, without a need of including all components shown in FIG. 5.

A hardware structure shown in FIG. 5 and the foregoing description are applicable to various terminals provided in the embodiments of the present invention. A person of ordinary skill in the art may understand that all or some of the steps of the foregoing methods may be implemented by a program instructing related hardware. The program may be stored in a computer readable storage medium. The computer readable storage medium includes: a ROM, a RAM, and an optical disc.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for adjusting multimedia playing progress, wherein the method comprises:

playing, by a terminal, a multimedia file;

receiving, by the terminal, a user input indicating a fast-forward operation fora playing progress of the multimedia file;

obtaining, by the terminal, a fast-forward record of the multimedia file, wherein the obtaining, by the terminal, the fast-forward record of the multimedia file comprises:

presetting the fast-forward record in the multimedia file, and obtaining, by the terminal, the fast-forward record by reading file information of the multimedia file; or obtaining, by the terminal from a stored fast-forward record, the fast-forward record for the multimedia file; or obtaining, by the terminal, the fast-forward record of the multimedia file from a server, wherein the fast-forward record comprises a fast-forward category, and the fast-forward record of the multimedia file is obtained according to the fast-forward category, wherein the fast-forward category comprises a leading role, a dialogue scene and specific object emergence, the method further comprising:

automatically adjusting, by the terminal, the playing progress of the multimedia file according to the fast-forward record.

2. The method according to claim 1, wherein the fast-forward record comprises time information and a priority, the time information comprises a video location and duration; and wherein the automatically adjusting, by the terminal, the playing progress of the multimedia file according to the fast-forward record comprises:
automatically adjusting, by the terminal, the playing progress of the multimedia file to the video location according to the priority in the fast-forward record.

3. The method according to claim 1, wherein the fast-forward record is added to the multimedia file by extending a type of a header file.

4. The method according to claim 1, wherein the server stores fast-forward records that are made by different terminals for the multimedia file and performs analysis on the fast-forward records; and the fast-forward record is obtained from an analyzed fast-forward record of the multimedia file from the server.

5. A terminal, wherein the terminal comprises:
a non-transitory memory storage comprising instructions; and
one or more hardware processors in communication with the memory storage, wherein the one or more hardware processors execute the instructions to:
play a multimedia file;
receive a user input indicating a fast-forward operation for a playing progress of the multimedia file;
obtain a fast-forward record of the multimedia file, wherein the one or more hardware processors execute the instructions to:
obtain the fast-forward record by reading file information of the multimedia file, wherein the fast-forward record is preset in the multimedia file; or
obtain, from a stored fast-forward record, the fast-forward record for the multimedia file; or
obtain the fast-forward record of the multimedia file from a server, wherein the fast-forward record comprises a fast-forward category, and the one or more hardware processors execute the instructions to obtain the fast-forward record of the multimedia file according to the fast-forward category, and wherein the fast-forward category comprises a leading role, a dialogue scene, and specific object emergence, and
wherein the one or more hardware processors further execute the instructions to:
automatically adjust the playing progress of the multimedia file according to the fast-forward record.

6. The terminal according to claim 5, wherein the fast-forward record comprises time information and a priority, the time information comprises a video location and duration; and the one or more hardware processors execute the instructions to:
automatically adjust the playing progress of the multimedia file to the video location according to the priority in the fast-forward record.

7. The terminal according to claim 5, wherein the fast-forward record is added to the multimedia file by extending a type of a header file.

8. The terminal according to claim 5, wherein the server stores fast-forward records that are made by different terminals for the multimedia file and performs analysis on the fast-forward records; and the one or more hardware processors execute the instructions to obtain the fast-forward record from an analyzed fast-forward record of the multimedia file from the server.

9. A non-transitory computer-readable medium storing computer instructions for adjusting multimedia playing progress, that when executed by one or more hardware processors, cause the one or more hardware processors to perform operations comprising:
playing a multimedia file;
receiving a user input indicating a fast-forward operation for a playing progress of the multimedia file;
obtaining a fast-forward record of the multimedia file, wherein obtaining the fast-forward record of the multimedia file comprises:
obtaining the fast-forward record by reading file information of the multimedia file, wherein the fast-forward record is preset in the multimedia file; or
obtaining, from a stored fast-forward record, the fast-forward record for the multimedia file; or
obtaining the fast-forward record of the multimedia file from a serve, wherein the fast-forward record comprises a fast-forward category, and the fast-forward record of the multimedia file is obtained according to the fast-forward category, and wherein the fast-forward category comprises a leading role, a dialogue scene, and specific object emergence,
wherein, when executed by one or more hardware processors, the computer instructions further cause the one or more hardware processors to perform operations comprising:
automatically adjusting the playing progress of the multimedia file according to the fast-forward record.

10. The non-transitory computer-readable medium according to claim 9, wherein the fast-forward record comprises time information and a priority, the time information comprises a video location and duration; and wherein the automatically adjusting the playing progress of the multimedia file according to the fast-forward record comprises:
automatically adjusting the playing progress of the multimedia file to the video location according to the priority in the fast-forward record.

11. The non-transitory computer-readable medium according to claim 9, wherein the fast-forward record is added to the multimedia file by extending a type of a header file.

* * * * *